United States Patent
Seibel et al.

(10) Patent No.: US 6,819,077 B1
(45) Date of Patent: Nov. 16, 2004

(54) METHOD AND APPARATUS FOR REDUCING SAMPLING RELATED ERRORS IN A MODULATING WAVEFORM GENERATOR USED WITH A PWM CONTROLLER

(75) Inventors: Brian J. Seibel, Grafton, WI (US); Russel J. Kerkman, Milwaukee, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 10/442,440

(22) Filed: May 21, 2003

(51) Int. Cl.$^7$ ................................................. H02P 5/34
(52) U.S. Cl. ...................... 318/801; 318/799; 318/800; 318/808; 318/811; 318/809
(58) Field of Search ............................. 318/799, 800, 318/808, 811, 809, 801

(56) References Cited

U.S. PATENT DOCUMENTS

| | | | |
|---|---|---|---|
| 5,400,240 A | * | 3/1995 | Araki ........................... 363/97 |
| 5,450,306 A | * | 9/1995 | Garces et al. ................. 363/41 |
| 5,831,410 A | | 11/1998 | Skibinski |
| 5,942,876 A | * | 8/1999 | Maekawa .................... 318/801 |
| 5,974,089 A | * | 10/1999 | Tripathi et al. ............. 375/247 |
| 2003/0052642 A1 | | 3/2003 | Kerkman et al. |
| 2004/0032230 A1 | * | 2/2004 | Schwarz et al. ............ 318/254 |

* cited by examiner

*Primary Examiner*—Rita Leykin
(74) *Attorney, Agent, or Firm*—Quarles & Brady LLP; William R. Walbrun

(57) ABSTRACT

A method and apparatus for use with a controller that samples a command frequency and provides modulating waveforms to a PWM inverter as a function of the sampled command frequency, the inverter also receiving a carrier signal having a carrier frequency, the method for reducing distortions in the modulating waveforms that result from sampling characteristics of the controller, the method comprising the steps of sampling the command frequency at a sampling frequency to generate a series of sampled signals, integrating the sampled signals to generate a phase angle, identifying a correction angle as a function of the sampling frequency, adding the correction angle to the phase angle to generate a corrected phase angle and using the corrected phase angle to generate the modulating waveforms to be provided to the PWM inverter

25 Claims, 10 Drawing Sheets

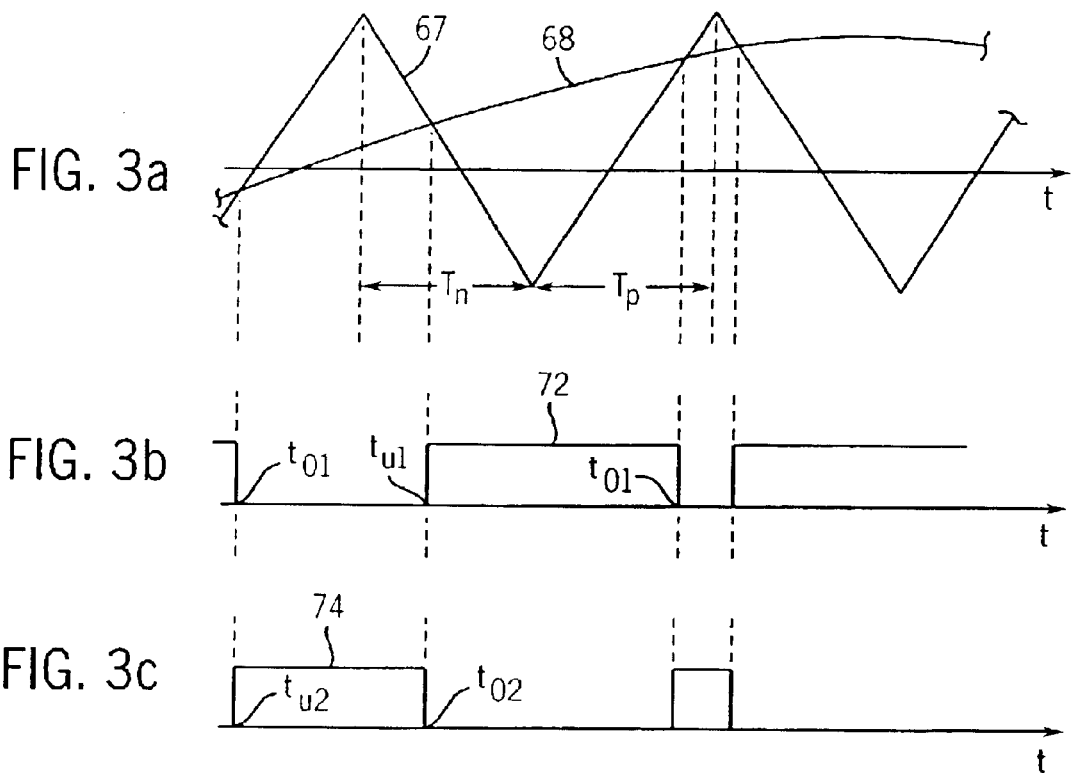
FIG. 3a
FIG. 3b
FIG. 3c
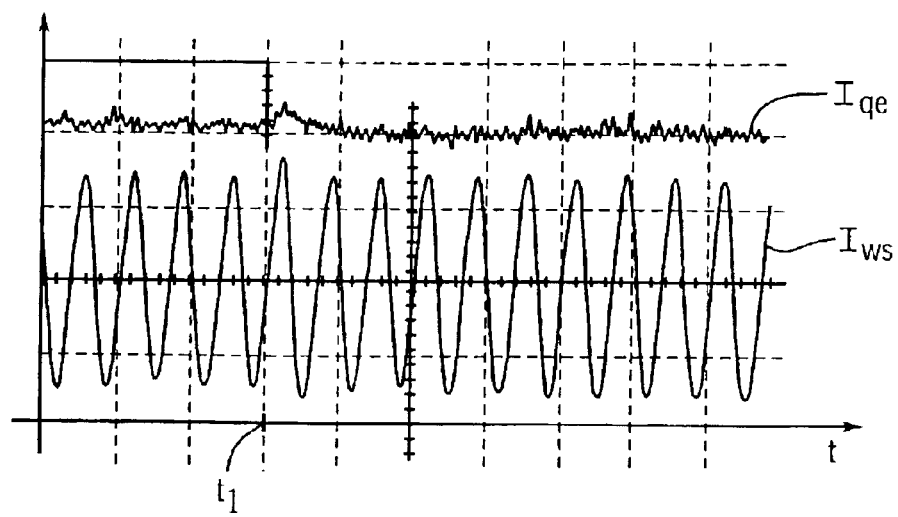
FIG. 4

METHOD AND APPARATUS FOR REDUCING SAMPLING RELATED ERRORS IN A MODULATING WAVEFORM GENERATOR USED WITH A PWM CONTROLLER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is pulse width modulated (PWM) controllers and more specifically a method and apparatus for modifying modulating signals as a function of a carrier frequency and/or an electrical operating frequency to minimize sampling related errors in phase shift and magnitude.

One type of commonly designed induction motor is a three phase motor having three Y-connected stator windings. In this type of motor, each stator winding is connected to an AC voltage source by a separate supply line, the source generating currents therein. Often, an adjustable speed drive (ASD) will be positioned between the voltage source and the motor to control motor speed.

Many ASD configurations include a PWM inverter consisting of a plurality of switching devices and a controller for controlling the inverter. Referring to FIG. 1, an exemplary inverter 9 has six switches 12–17. The switches 12–17 are arranged in series pairs between positive and negative DC buses 48 and 49, each pair forming one of three inverter legs 39, 40, and 41. Each switch includes a high speed semiconductor switching device in inverse parallel relationship with a diode. For example, diode 23 is associated with switch 12. Similarly, diodes 25, 27, 24, 26 and 28 are associated with switches 14, 16, 13, 15 and 17, respectively.

A controller 11 is linked to each switch by a separate control line. For example, controller 11 is linked to switch 12 via line 51. Similarly, controller 11 is linked to switches 13,14, 15, 16 and 17 via lines 52,53, 54, 55 and 56, respectively. Controller 11 controls the on and off cycles of the switches 12–17 via lines 51–56.

Referring still to FIG. 1, each leg 39, 40 and 41 is linked to a separate one of three motor terminals 31, 30 32, respectively. Referring specifically to leg 39, by triggering switches 12, 13 on and off in a repetitive sequence, terminal 31 and winding 36 linked to leg 39 receives high frequency DC voltage pulses. Similarly, each of legs 40 and 41 are controlled to provide pulses to associated terminals 30 and 32 and hence to windings 35 and 37.

Referring to FIG. 2, an exemplary sequence of high frequency voltage pulses 60 that inverter 9 might provide to terminal 31 can be observed along with an exemplary low frequency alternating fundamental voltage 62 and related alternating current 69. By varying the widths of positive portions 63 of each high frequency pulse relative to the widths of negative portions 64 over a series of high frequency voltage pulses 60, a changing average voltage which alternates sinusoidally is generated. The changing average voltage defines the low frequency alternating voltage 62 that drives motor 19. Low frequency alternating voltage 62 in turn produces low frequency alternating current 69 that lags the voltage by a phase angle Φ. By triggering switches 12 and 13 in a regulated sequence, inverter 9 is used to control both the amplitude and frequency of voltage 62 that eventually reach the stator windings (e.g., 36).

Referring to FIG. 3a, representative waveforms used to generate trigger signals for leg 39 are illustrated. As well known in the art, a carrier signal or waveform 67 is perfectly periodic and operates at what is known as a carrier frequency $f_c$. A command or modulating voltage waveform 68 is sinusoidal, having a much lower frequency $f_e$ and a greater period than carrier signal 67.

Referring also to FIGS. 3b and 3c, an upper trigger signal 72 and a lower trigger signal 74 corresponding to a comparison of waveforms 67 and 68 and for controlling the upper and lower switches 12, 13, respectively, can be observed. The turn-on $t_{u1}, t_{u2}$ and turn-off $t_{o1}, t_{o2}$ trigger times of the upper and lower signals 72, 74 come from the intersections of command waveform 68 and carrier waveform 67.

When command waveform 68 intersects carrier waveform 67 while carrier waveform 67 has a positive slope (i.e. during periods $T_p$), upper signal 72 goes OFF and lower signal 74 goes ON. When command waveform 68 intersects carrier waveform 67 while carrier waveform 67 has a negative slope (i.e. during periods $T_n$), upper signal 72 goes ON and lower signal 74 goes OFF. Thus, by comparing carrier waveform 67 to command waveform 68, trigger times are determined.

Early control systems operated using only a single carrier signal frequency which, at the time, addressed most application requirements and was suitable given inverter switching limitations. As switching technology has evolved, however, much higher switching speeds have been realized and hence a much greater range of carrier signal frequencies are now available. With control system evolution it has been recognized that carrier signal frequency can have various advantageous and disadvantageous affects on system control and that, therefore, different carrier frequencies are ideal for different applications. For example, harmonic content in a PWM system has been known to generate audible noise in certain applications. The harmonic content in a PWM system can be altered to some degree by altering the carrier frequency and hence audible noise can typically be tuned out of a system via carrier frequency changes.

As another example, increased carrier frequency sometimes results in reflected voltages that have been known to damage system cabling and/or motor windings (see U.S. Pat. No. 5,831,410 titled "Apparatus used with AC motors for eliminating line voltage reflections" which issued on Feb. 12, 1997 for a detailed explanation of reflected waves). As one other example, when carrier frequencies are increased the number of switching cycles are similarly increased and overall switching losses (e.g., switching losses occur during each switching cycle) and system heating are also increased. As yet another example, as carrier frequency is increased ripple current in the resulting waveforms is reduced appreciably. Thus there are tradeoffs that have to be understood and accounted for when selecting carrier frequency for specific system configurations and applications.

There are many systems today that allow carrier frequency to be altered to address application specific requirements. In addition, there are several applications where carrier frequency is altered on the fly as a function of other operating parameters and intended control requirements. For one example of an application where carrier frequency is altered on the fly, see U.S. patent application Ser. No. 09/956,781 titled "Method and Apparatus for Compensating for Device Dynamics by Adjusting Inverter Carrier Frequency" which was filed on Sep. 20, 2001 and which is commonly owned with the present invention.

Unfortunately, under certain circumstances, on the fly carrier frequency changes have been known to cause system disturbances. To this end, FIG. 4 illustrates an exemplary q-axis torque producing current $I_{qe}$ and a resulting single phase current $I_{ws}$ where a carrier frequency $f_c$ is altered at time $\tau_1$ from 3 KHz to 4 KHz. As illustrated, when the carrier frequency is altered at time $\tau_1$, a noticeable current disturbance occurs which shows up in single phase current $I_{ws}$ most noticeably as a magnitude change. Although less noticeable, a phase change also occurs at time $\tau_1$.

Disturbances like the one illustrated in FIG. 4 occur because of the way in which modulating waveforms are generated for comparison to carrier signals. In this regard, an exemplary modulating waveform generator 200 is illustrated in FIG. 5. The generator 200 receives a command frequency signal $\omega_e$ in radians/second and two phase synchronous d and q-axis command voltage signals $V_{qe}$ and $V_{de}$ (e.g., from a synchronous current frame regulator) and uses those signals to generate three phase modulating waveforms for use by a PWM inverter (see 217). To this end, generator 200 includes a sampler 202, an integrator 204, a synchronous to stationary transformer 206, a multiplier 208, a two-to-three phase converter 210 and a carrier frequency selector 211. Although illustrated in FIG. 5, carrier signal generator 213 and PWM inverter 217 are not part of the modulating waveform generator.

As its label implies, carrier frequency selector 211 is used to select the carrier frequency $f_c$ either manually or, in the case of more sophisticated systems, automatically, as a function of sensed system operating parameters (e.g., component temperatures, sensed ripple/harmonics, etc.). The carrier frequency $f_c$ is provided to each of carrier signal generator 213 and sampler 202. Signal generator 213 uses frequency $f_c$ to generate a high frequency carrier signal (e.g., 67 in FIG. 3a) that is provided to inverter 217 for comparison as described above.

In the embodiment described here, it is assumed that sampler 202 is programmed to sample the command frequency $\omega_e$ once per carrier period. Thus, the sampling frequency $f_s$ is equal to the carrier frequency $f_c$ and sampler 202 samples frequency $\omega_e$ every period $T_s$ where period $T_s=1/f_c$. The sampled values are provided to integrator 204 which outputs the integrated value as a phase angle $\theta_e$. The integrator output is a stepped signal as illustrated at 212 where the output value changes every sampling period $T_s$.

Stepped phase angle signal $\theta_e$ is provided to synchronous to stationary converter 206 which generates a 2×2 matrix 219 of values in the stationary frame of reference. The two phase synchronous voltages $V_{qe}$ and $V_{de}$ form a 2×1 matrix 221 and are multiplied by 2×2 matrix 219 thereby generating two phase stationary frame voltage command values 223 (see also 229). Converter 210 converts the two phase stationary frame voltage command values to three phase modulating signals that are in turn provided to PWM inverter 217 for comparison to the carrier signal.

Referring to FIG. 6, an exemplary ideal fundamental modulating waveform 68 is illustrated along with a sampled or discretized modulating waveform signal 91 that may be produced by multiplier 208 illustrated in FIG. 5. Waveform 68 corresponds to a waveform that would result if the sampling period $T_s$ was a zero or near zero duration.

Referring also to FIG. 7, a small segment of waveform 68 is illustrated along with two separate associated discretized or sampled waveform signals 91 and 93 where the sampled signals correspond to different sampling frequencies. Sampled signal 91 corresponds to a 4 kHz sampling frequency while signal 93 corresponds to an 8 kHz sampling frequency. In addition to waveforms 68, 91 and 93, FIG. 7 also illustrates separate fundamental components of modulating waveforms associated with sampled signals 91 and 93. In FIG. 7, fundamental component 95 corresponds to the 4 kHz sampling signal 91 while fundamental components 97 corresponds to the 8 kHz sampling signal 93.

A simple analysis of FIG. 7 makes clear that the fundamental component of a modulating waveform generated using sampled values of the command frequency $\omega_e$ is phase shifted by an error angle. In FIG. 7, the phase shift error corresponding to fundamental component 95 is identified as $\Delta_1$ while the error corresponding to fundamental component 97 is identified as $\Delta_2$. In addition, although not easily observable in either of FIG. 6 or 7, the fundamental components 95 and 97 associated with sampled signals 91 and 93 have lower magnitudes than ideal waveform 68.

While existing commutation algorithms have been developed to compensate for processing delays intrinsic in any electronic components, these algorithms generally do not contemplate compensating for distortion due to sampler related phase and magnitude errors. In many applications where carrier to operating frequency ratios are much greater than unity these commutation algorithms provide suitable results. Unfortunately reflected wave requirements, thermal regulation algorithms and wide speed operation render the great than unity ratio assumption questionable at best.

While reduced modulating waveform magnitudes and phase shifts from ideal waveforms are problematic generally, the affects of these errors on load control are most pronounced when operating frequency or carrier frequency changes occur (see again FIG. 4 where carrier frequency was altered at time $\tau_1$). Referring again to FIG. 7, as described above, when the carrier frequency $f_c$ and hence the sampling frequency $f_s$ is 8 kHz, the resulting modulating waveform has a fundamental component 97 and when the carrier and sampling frequency $f_s$ are 4 kHz, the resulting modulating waveform has a fundamental component 95. Thus, a carrier frequency change from 8 to 4 kHz or from 4 to 8 kHz results in a fundamental component phase shift identified as $\Delta_3$ in FIG. 7. Similar phase shifts occur when other carrier frequency changes occur. While errors occur in the resulting fundamental components as illustrated in FIG. 7, it should be appreciated that distortions occur in other harmonics in the resulting waveforms and should to be corrected.

Thus, there is a need for a controller that can accurately compensate for distortions that occur when carrier frequency used with a PWM controller is altered and to essentially eliminate sampling related phase and magnitude errors.

BRIEF SUMMARY OF THE INVENTION

It has been recognized that the magnitude of the error that results from the sampling/discretizing process is a function of the ratio of the carrier frequency $f_c$ to the electrical operating frequency $f_e$. In this regard, experiments have shown that when the ratio of carrier frequency $f_c$ to operating frequency $f_e$ is large, the magnitude of the phase error resulting therefrom is relatively small and when the ratio is relatively small the magnitude of the phase error resulting therefrom is relatively large. Similarly, when ratio $f_c/f_e$ is small, the phase distortion that results from a carrier/ sampling frequency change is appreciable. Thus, in at least some embodiments of the invention, phase correction is facilitated by tying a correction angle to the carder or sampling frequency or to the ratio of the carrier frequency to the operating frequency.

It has also been recognized that the magnitude error in a modulating waveform generated through sampling is also related to the carrier frequency/operating frequency ratio. Thus, in at least some embodiments of the invention, in addition to a phase correction operation, inventive systems also implement a magnitude correction operation where the magnitude correction is a function of the operating and carrier frequencies.

Consistent with the above, the invention includes a method for use with a controller that samples a command frequency and provides modulating waveforms to a PWM inverter as a function of the sampled command frequency, the inverter also receiving a carrier signal having a carrier frequency, the method for reducing distortions in the modulating waveforms that result from sampling characteristics of the controller, the method comprising the steps of sampling the command frequency at a sampling frequency to generate a series of sampled signals, integrating the sampled signals to generate a phase angle, identifying a correction angle as a function of the sampling frequency, adding the correction angle to the phase angle to generate a corrected phase angle and using the corrected phase angle to generate the modulating waveforms to be provided to the PWM inverter.

In some embodiments the step of identifying a correction angle includes identifying the correction angle as a function of both the sampling frequency and the command frequency. More specifically, the step of identifying a correction angle may include identifying the correction angle as a function of the ratio of the command frequency to the sampling frequency. Even more specifically, the step of identifying a correction angle d may include solving the following equation:

$$\delta = \omega_e T_s/2$$

where $\omega_e$ is the command frequency in radians/second and $T_s$ is the sampling period.

In some cases the step of using the corrected phase angle to generate the modulating waveforms includes the steps of receiving two phase synchronous voltage command signals, mathematically combining the voltage command signals and the corrected phase angle to generate two phase corrected voltage command signals in the stationary frame of reference and converting the two phase corrected voltage command signals to three phase command signals.

Some embodiments further include the step of identifying a voltage magnitude correction value as a function of the sampling frequency and the step of mathematically combining the voltage command signals and the corrected phase angle may include combining the voltage command signals, the corrected phase angle and the voltage magnitude correction value. Here, the step of combining the voltage command signals, the corrected phase angle and the voltage magnitude correction value may include the steps of multiplying the voltage magnitude correction value by the two phase synchronous voltage command signals to generate corrected two phase voltage command signals, performing a stationary to synchronous conversion on the corrected phase angle to generate a two by two stationary matrix and multiplying the corrected two phase voltage command signals by the two by two stationary matrix to generate the two phase corrected voltage command signals in the stationary frame of reference.

The step of identifying a voltage magnitude correction value as a function of the sampling frequency may include the step of identifying a voltage magnitude correction value as a function of both the sampling frequency and the command frequency. More specifically, the step of identifying a voltage correction magnitude value Vcorr may include the step of solving the following equation:

$$V_{corr} = \frac{1}{\sin c(\omega_e T_s/2)}$$

The invention also includes a method for use with a controller that samples a command frequency and receives two phase synchronous command voltages and provides modulating waveforms to a PWM inverter as a function of the sampled command frequency and command voltages, the inverter also receiving a carrier signal having a carrier frequency, the method for reducing distortions in the modulating waveforms that result from sampling characteristics of the controller, the method comprising the steps of sampling the command frequency at a sampling frequency to generate a series of sampled signals, integrating the sampled signals to operating frequency to the sampling frequency to generate a corrected phase angle, modifying the two phase command voltages as a function of the ratio of the operating frequency to the sampling frequency to generate corrected two phase voltage command signals, mathematically combining the corrected two phase voltage command signals and the corrected phase angle to generate two phase voltage command signals in a stationary frame of reference and converting the two phase voltage command signals in the stationary frame of reference to three phase signals to be provided to the PWM inverter.

Moreover, the invention includes a controller that receives a command frequency and provides modulating waveforms to a PWM inverter as a function of the command frequency, the inverter also receiving a carrier signal having a carrier frequency, the controller for reducing distortions in the modulating waveforms that result from sampling characteristics of the controller, the controller comprising a sampler for sampling the command frequency at a sampling frequency to generate a series of sampled signals, an integrator for integrating the sampled signals to generate a phase angle, a correction angle determiner for identifying a correction angle as a function of the sampling frequency, a summer for adding the correction angle to the phase angle to generate a corrected phase angle and a processor using the corrected phase angle to generate the modulating waveforms to be provided to the PWM inverter.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 3a is a graph illustrating exemplary waveforms used by a PWM inverter to produce the high frequency pulses shown in FIG. 2, FIG. 3b and FIG. 3c are graphs illustrating PWM trigger signals;

FIG. 4 is a plot illustrating various current waveforms;

DETAILED DESCRIPTION OF THE INVENTION

A. Theory

To correct for the sampling related phase and magnitude distortions as described above, first, the source of the errors has to be determined and then the error magnitudes have to be quantized and tied to some determinable operating parameters. In order to study the source and magnitudes of the phase and magnitude errors, exemplary modulating waveform generator 200 (see again FIG. 5) can be represented in a complimentary form in the frequency domain.

Figure 1:
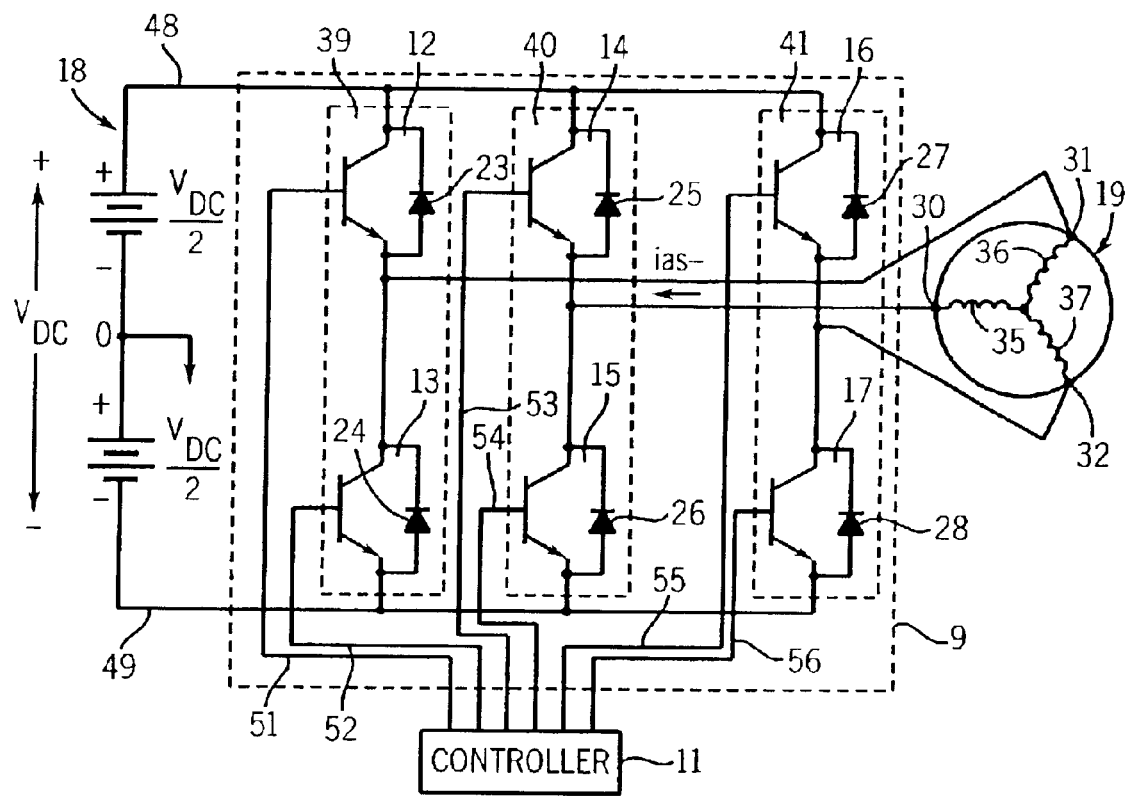
FIG. 1 is a schematic diagram of a controller and a PWM inverter which incorporates the present invention.
Figure 2:
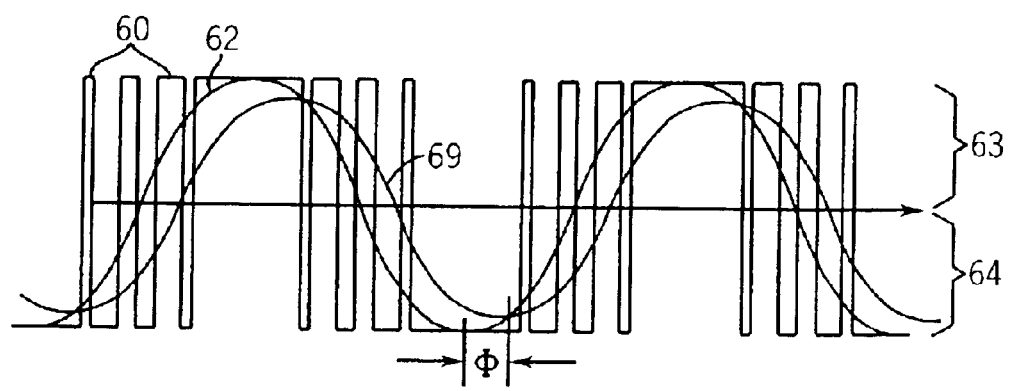
FIG. 2 is a graph illustrating high frequency pulses and a resulting low frequency alternating voltage applied to a stator winding by a PWM inverter.
Figure 5:
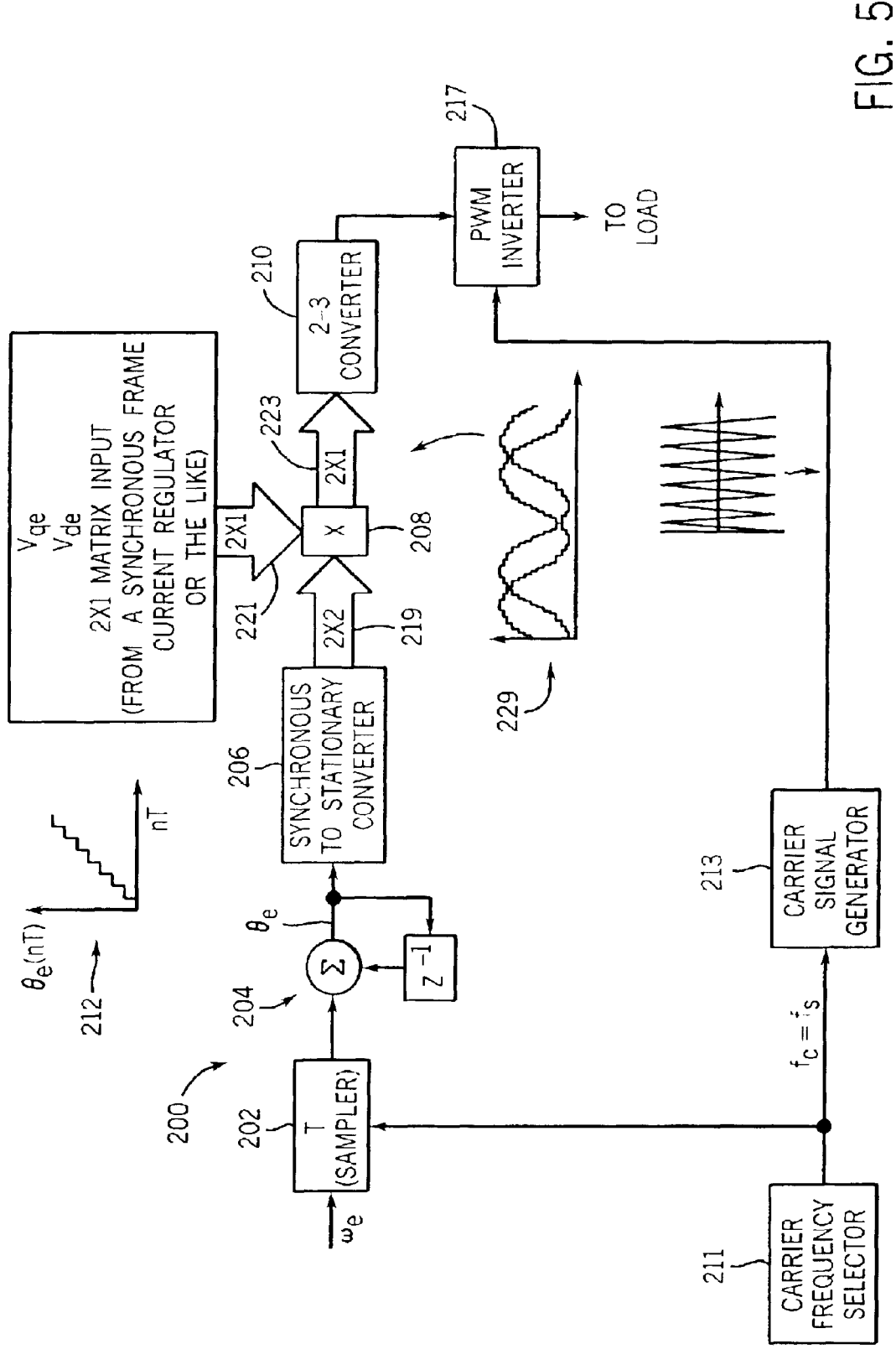
FIG. 5 is a schematic illustrating a modulating wave generator.
Figure 8:
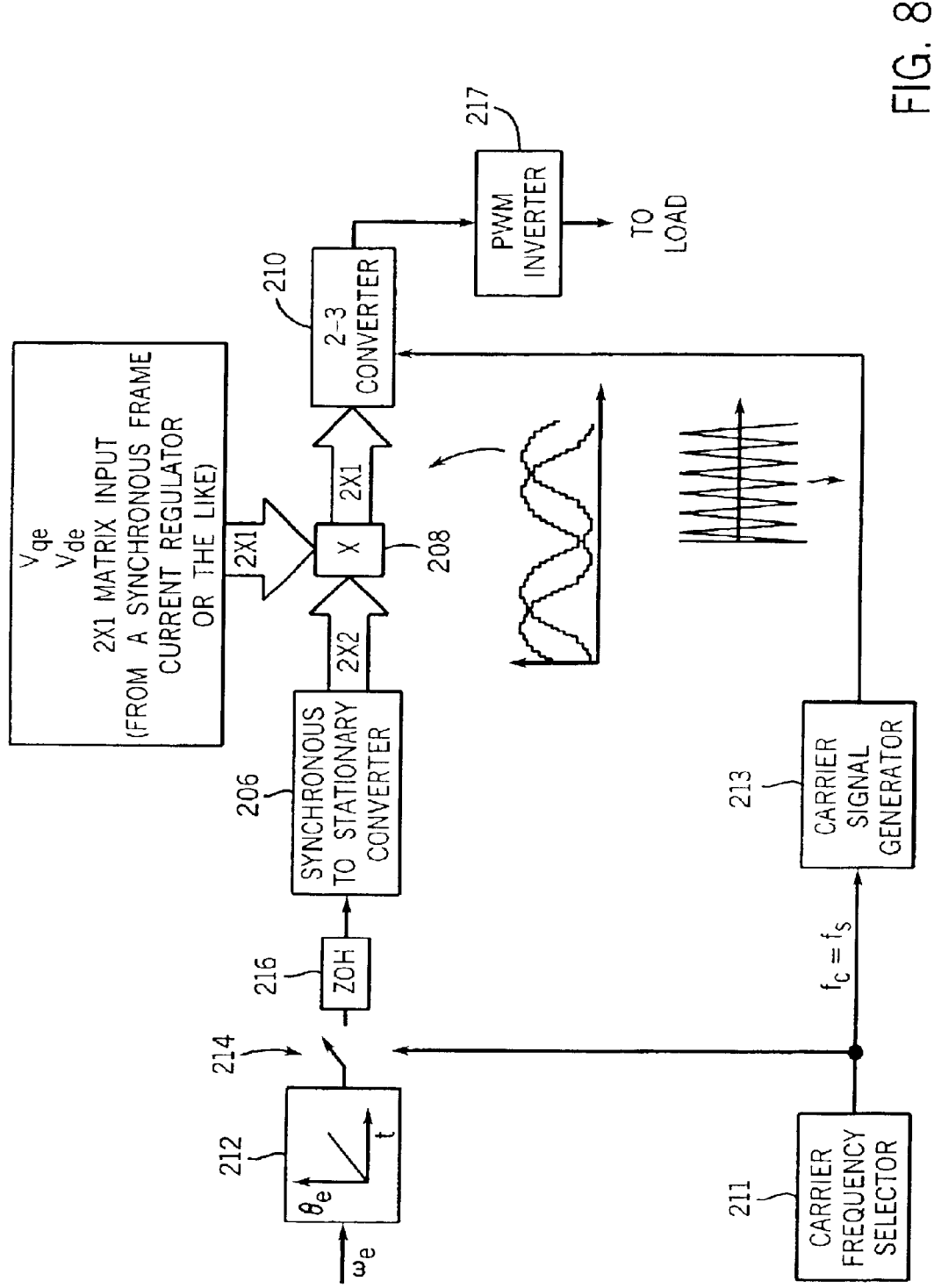
FIG. 8 is an equivalent schematic of the waveform generator of FIG. 5.
Figure 9:
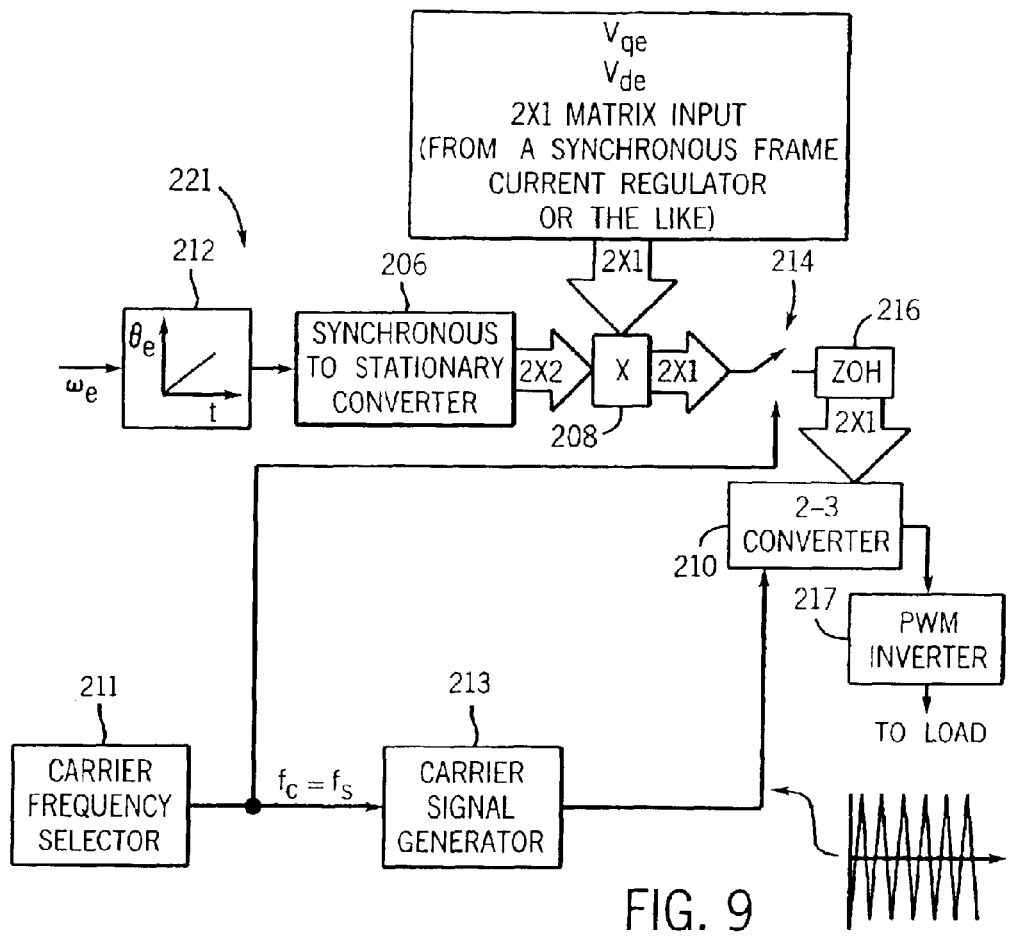
FIG. 9 is an equivalent schematic of the waveform generator of FIG. 8.

Referring to FIGS. 5 and 8, the sampler 202 and integrator 204 of FIG. 5 can be replaced by an equivalent combination including an integrator 212, an ideal sampler 214 and a zero order hold (ZOH) block 216 (e.g., the well known sinc function). In FIG. 8 components 206, 208, 210, 211, 213 and 217 are identical to similarly labeled components in FIG. 5. Referring also to FIG. 9, sampler 214 and ZOH block 216 can be moved to the right of the vector product operation corresponding to block 208 to configure equivalent time domain configuration 221.

Figure 10:
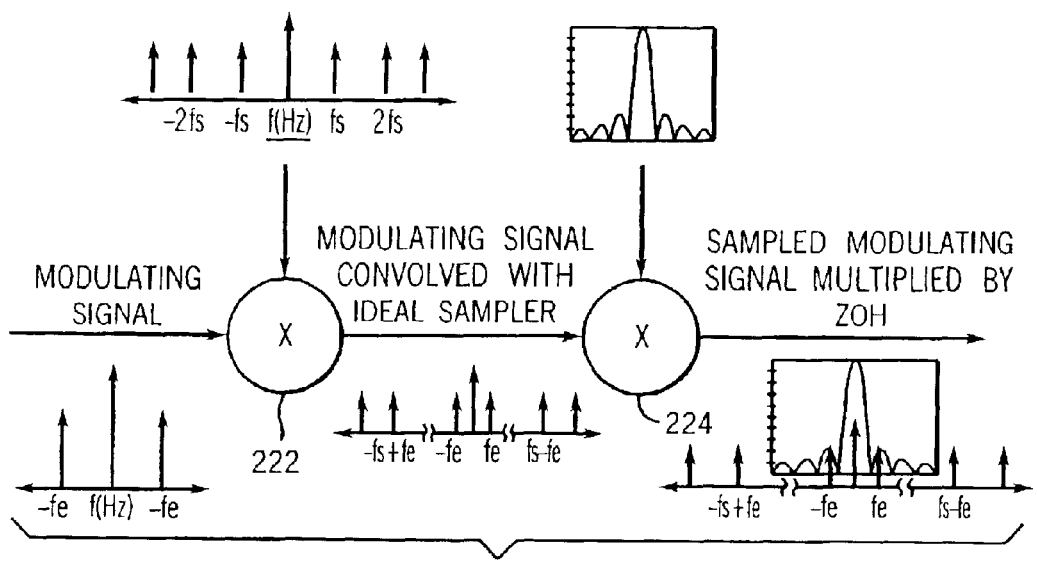
FIG. 10 is an equivalent representation of the waveform generator of FIG. 9, albeit in the frequency domain.

Configuration 221 of FIG. 9 can be represented in the frequency domain by the schematic illustrated in FIG. 10 which shows how the modulating waveform generating process evolves in the frequency domain. To this end, the two phase modulating signals which include sine wave pulses are convolved by convolver 222 with the ideal sampler which is represented by an infinite series of impulses to generate an infinite series of impulses that are provided to multiplier 224. Here, note that multiplication in the time domain corresponds to convolution in the frequency domain.

The infinite series of impulses are next multiplied by the ZOH function at block 224—the process represented by block 224 is not a convolution since the ZOH operation is a convolution in the time domain. The output of block 224 is an infinite number of impulses modulated by the sinc function decreasing in amplitude and increasing phase shift with increasing frequency. The fact that the amplitude decreases with increasing frequency indicates that the disturbances in the modulating waveform that occur when changing the carrier frequency on the fly are associated closely with ZOH multiplier block 216 (see again FIG. 9).

To quantify the ZOH related disturbances, magnitude and phase plots of errors can be generated. To this end, assume sampling and carrier frequencies that are identical (e.g., 2 kHz) so that the PWM registers are updated once per carder cycle. Here, the frequency spectrum of sampled modulating signals used to perform a duty cycle conversion will be the composite signal at the output of the ZOH block (FIGS. 9 and 10 ). The magnitude of the output signal (FIG. 10) is the product of the sampled modulating signal and the magnitude response of the ZOH. The phase of the output signal is the sum of the modulating signal phase and the phase of the ZOH.

Figure 11:
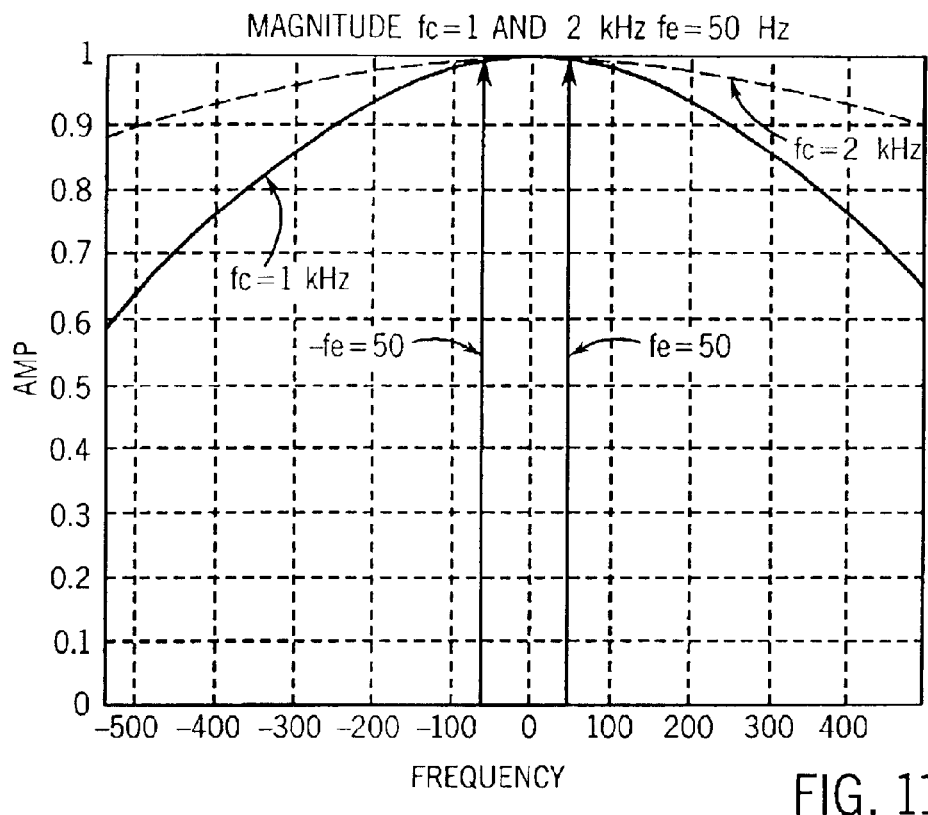
FIG. 11 is a magnitude plot of errors that result from operation of the generator illustrated in FIG. 5 at various command frequencies and at two different carrier frequencies.
Figure 12:
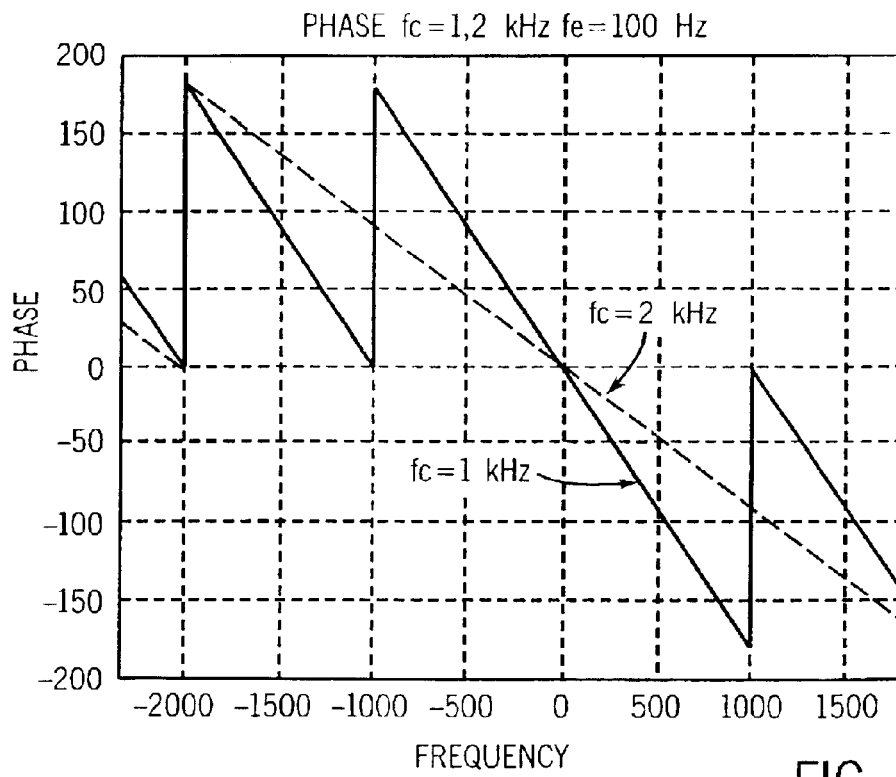
FIG. 12 is a phase error plot generated using the waveform generator of FIG. 5 and corresponding to various operating frequencies and two different carrier frequencies.

Consistent with the above discussion, error magnitude and phase plots, FIGS. 11 and 12, respectively, have been generated for various command frequencies and carrier/sampling frequencies so that a visual representation of the errors can be examined. In FIGS. 11 and 12, plots are provided for 1 KHz and 2 KHz sampling frequencies and for a range of command operating frequencies.

Referring to FIGS. 11 and 12, some general observations can be made. First, with high carrier frequencies, the errors corresponding to operating frequencies within the typical range of OHz 400 Hz are negligible. Second, the phase shift illustrated in FIG. 12 is linear and follows the classical sinc function. Third, low carrier frequencies $f_c$ or higher operating frequencies $f_e$ (low $f_c/f_e$ ratios) produce a disturbance in magnitude of the signal provided to the PWM inverter and ultimately to the output of the PWM inverter. Fourth, the magnitude of the distortions is related to the ratio $f_c/f_e$ such that, as ratio $f_c/f_e$ is decreased, the magnitude of the distortions is increased.

Thus, in general, phase shift and magnitude errors due to sampling characteristics can be compensated by generating correction signals that are a function of the sampling period $f_s$. More specifically, the correction values should be made a function of both the sampling period $f_s$ and the commanded operating frequency $f_e$.

Here, in at least one embodiment of the invention, a phase correction angle $\delta$ to be added to the synchronous frame angle $\theta_e$ can be generated by executing the following equation:

$$\delta = \omega_s T_c/2$$

Period $T_s = 1/f_s = 1/f_c$ and therefore Equation 1 can be rewritten as:

$$\delta = \frac{\omega_e}{2f_s} \qquad (2)$$

Figure 7:
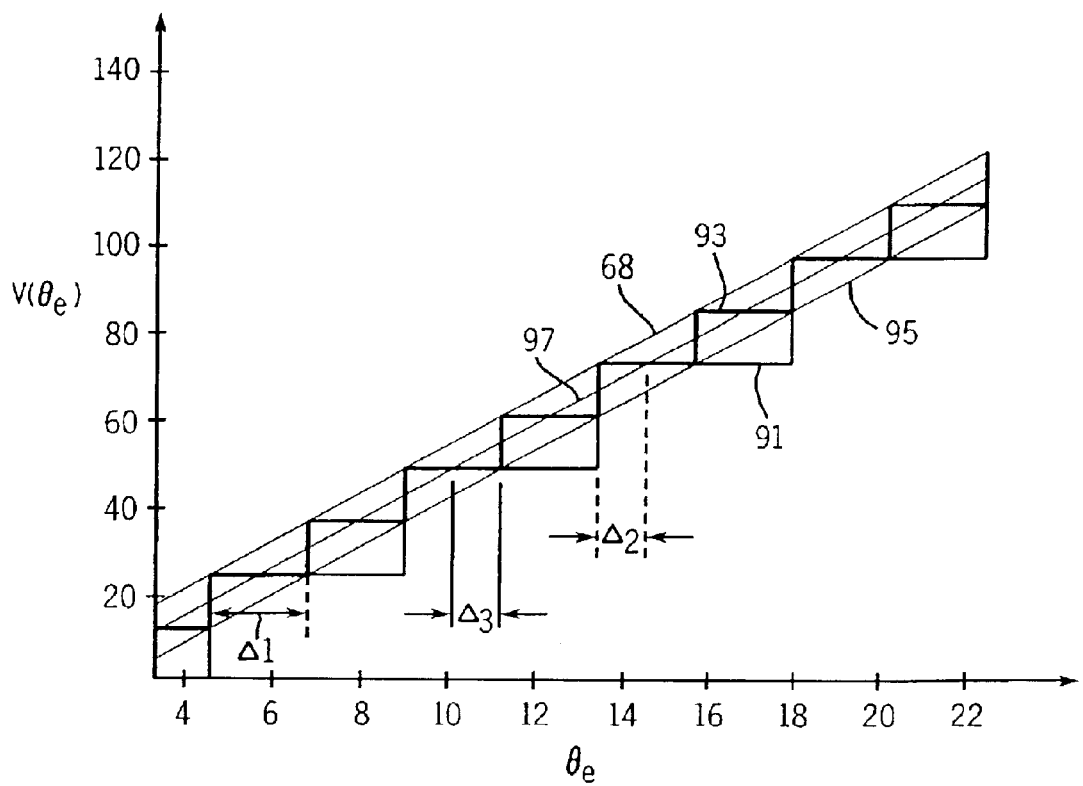
FIG. 7 is a graph similar to FIG. 6, albeit illustrating a smaller section of the waveforms of FIG. 6 and illustrating sampled waveforms corresponding to two different sampling frequencies.

Examining Equation 2, it can be appreciated that the magnitude of correction angle $\delta$ is tied to the ratio of $f_c/f_e$ such that when ratio $f_c/f_e$ is low and hence greater phase distortion can be anticipated, Equation 2 yields a relatively larger correction angle $\delta$ and, when ratio $f_c/f_e$ is relatively high and hence relatively less phase distortion can be anticipated, Equation 2 yields a smaller relative correction angle $\delta$. To this end, assuming a constant command frequency $\omega_e$, if a sampling frequency $f_s$ (i.e., $f_c$) is 8 kHz, the correction angle $\delta$ will be less than if the sampling frequency $f_s$ is 4 kHz. Referring again to FIG. 7, distortion $\Delta_2$ corresponding to an 8 kHz sampling frequency is smaller phase distortion $\Delta_1$ corresponding to a 4 kHz sampling frequency (e.g., the difference is $\Delta_3$) and therefore Equation 2 results in the appropriate relative correction.

The magnitude distortion can be compensated by multiplying the two phase synchronous frame voltage values $V_{qe}$ and $V_{de}$ by a correction voltage value Vcorr determined by solving the following equation:

$$V_{corr} = \frac{1}{\sin c(\omega_e T_s/2)} \qquad (3)$$

B. Implementation of Correction

Figure 13:
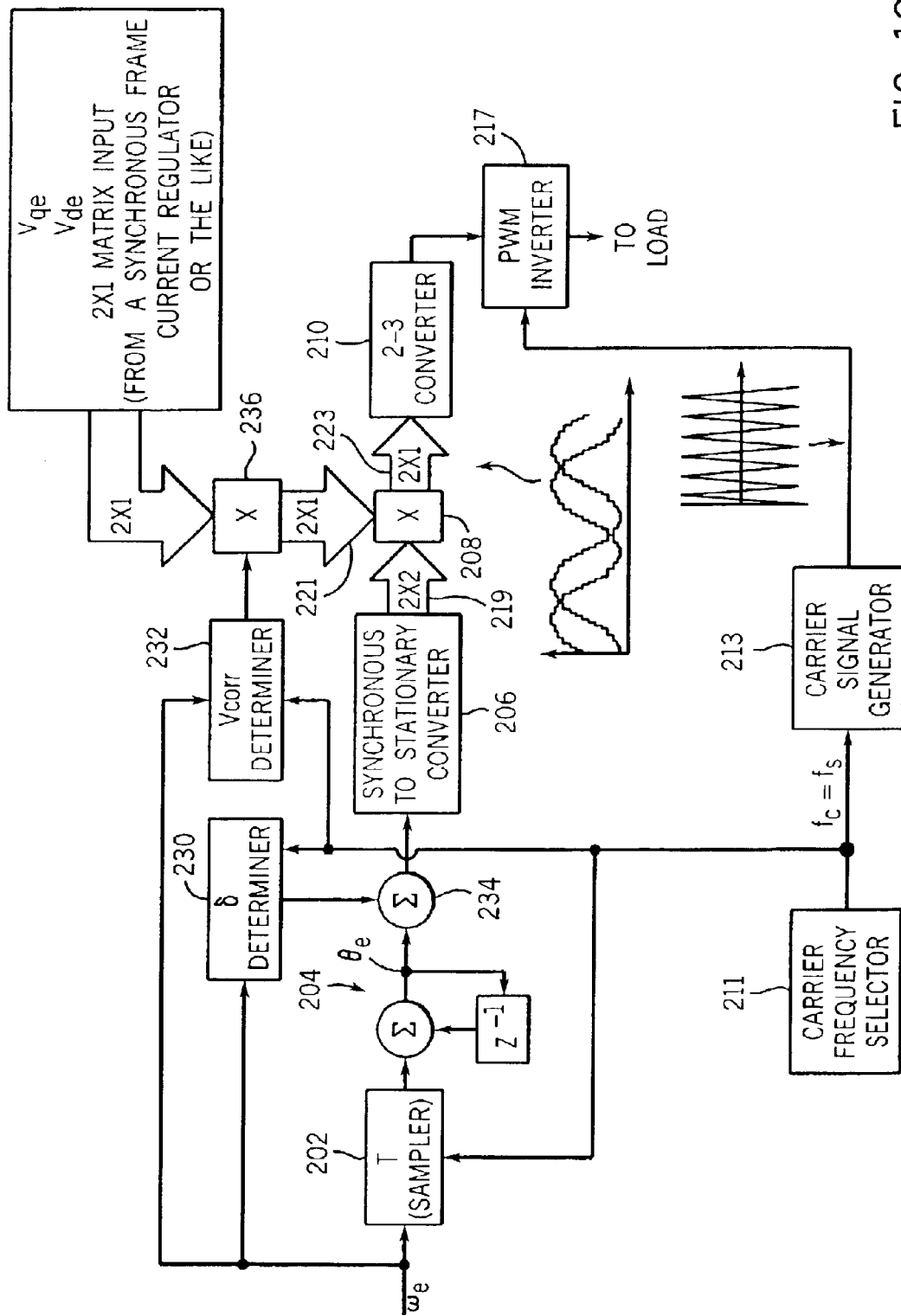
FIG. 13 is a schematic diagram similar to the diagram of FIG. 5, albeit incorporating the present invention.

FIG. 13 is a schematic similar to the schematic of FIG. 5 except that correction hardware consistent with at least one embodiment of the invention has been added. Components in FIG. 13 that are similar to the components of FIG. 5 are identified by identical numbers. In addition to the components of FIG. 5, the embodiment of FIG. 13 includes phase and magnitude error determiners 230 and 232, respectively, a summer 234 and a multiplier 236. Determiner 230 receives each of the command frequency and the carrier frequency (e.g., the sampling frequency in a once per carrier cycle sampling system) and uses those values to solve Equation 1 above (e.g., $T_s=1/f_s=1/f_c$). Similarly, determiner 232 receives each of the command operating frequency and the carrier frequency and uses those values to solve Equation 3 above. The $\delta$ and Vcorr values are provided to summer 234 and multiplier 236, respectively.

As in the case of FIG. 5, sampler 202 samples command frequency $\omega_e$ once per sampling period and provides the sampled values to integrator 204. Integrator 204 integrates the received signals and provides a phase angle output $\theta_e$ to summer 234. Summer 234 adds correction angle $\delta$ to phase angle $\theta_e$ and thereby generates a corrected phase angle which is provided to synchronous to stationary converter 206. Converter 206 transforms the corrected phase angle to a 2×2 matrix in the stationary frame of reference which is provided to multiplier 208.

Multiplier 236 multiplies corrected voltage value Vcorr and the two phase voltage value $V_{qe}$ and $V_{de}$ to generate corrected two phase voltage values that are provided as a 2×1 matrix to multiplier 208. Multiplier 208 multiplies the received values thereby generating corrected two phase stationary d and q axis command voltages $V_{ds}$ and $V_{qs}$ that are provided to converter 210 for two-to-three phase transformation. The output of converter 210 is provided to PWM inverter 217.

C. Experimental Results

Figure 6:
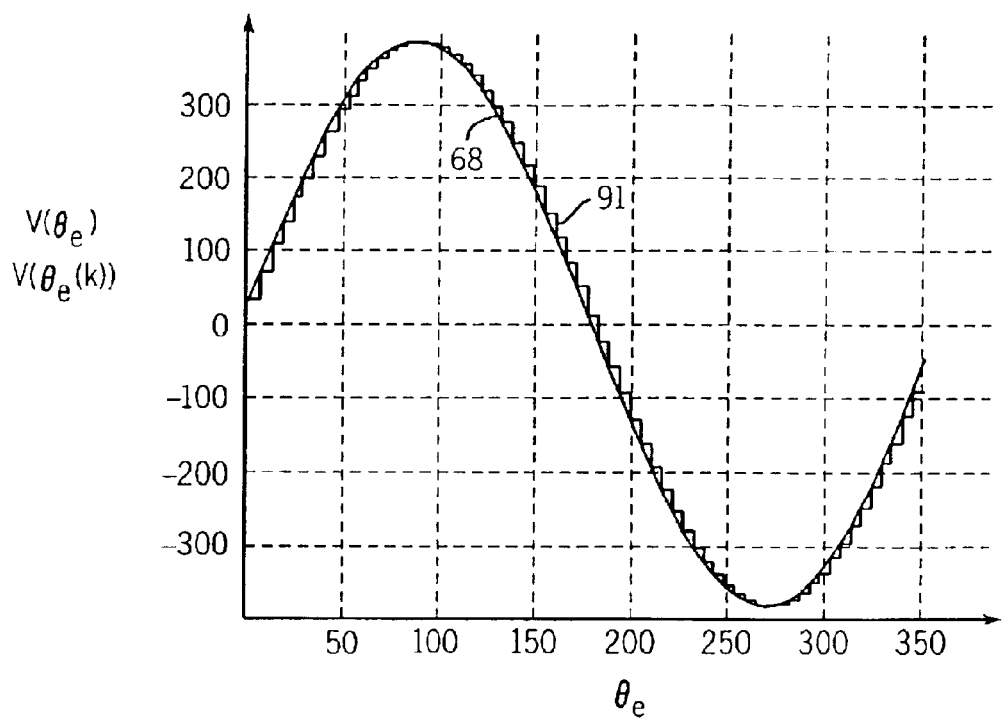
FIG. 6 is a plot illustrating an ideal modulating waveform and a sampled or discretized modulating waveform that results from a sampling process performed by the generator of FIG. 5.
Figure 14:
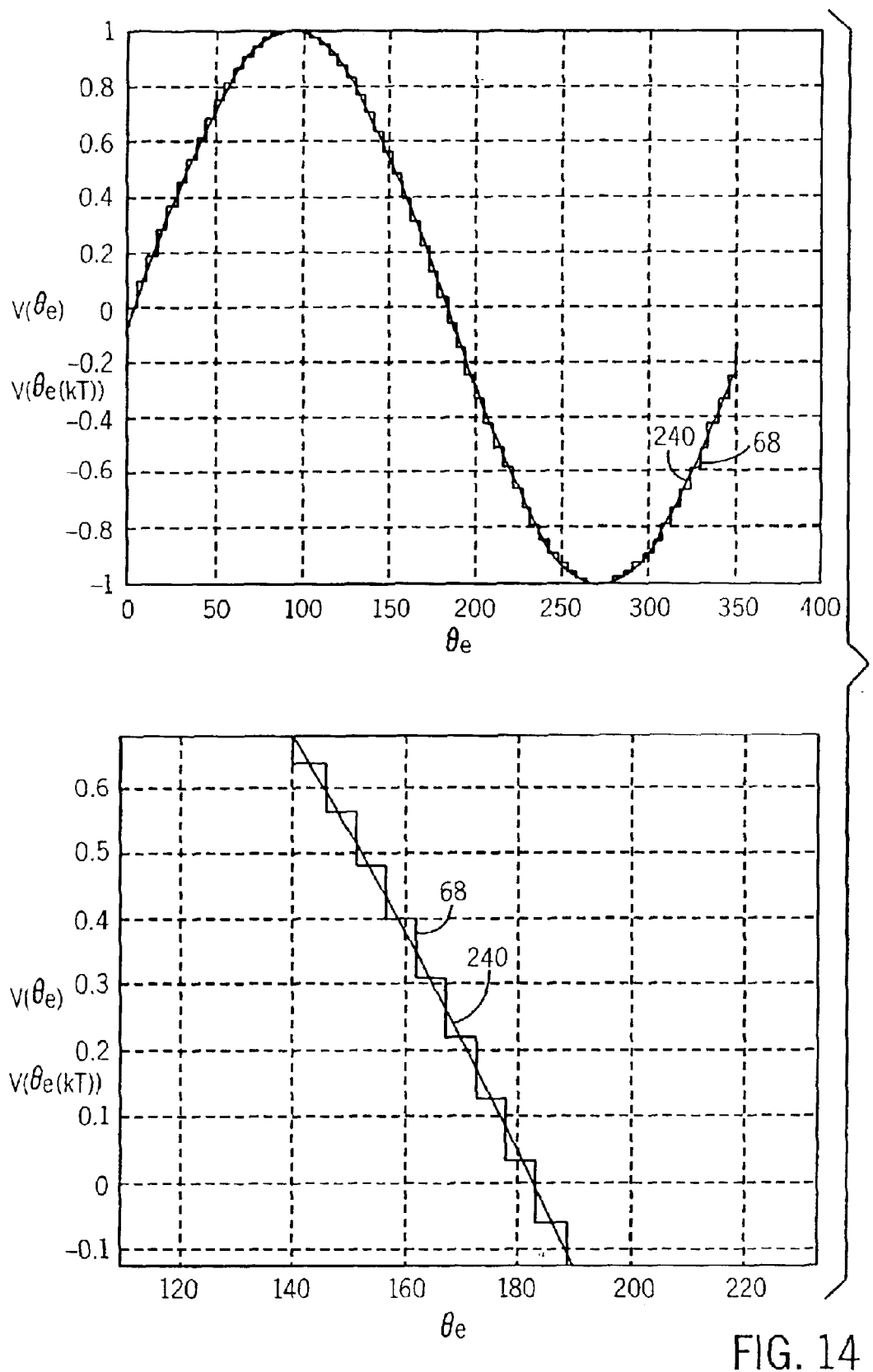
FIG. 14 includes two different plots, each of the plots illustrating an ideal modulating waveform and a sampled or discretized modulating waveform generated via the inventive waveform generator illustrated in FIG. 13.

A simple verification of the correction is possible by examining the fundamental component of a sampled command signal generated using the configuration of FIG. 13. and using operating parameters identical to those used to generate the waveforms of FIG. 6. FIG. 14 illustrates the results of this examination and includes an ideal modulating waveform 68 and a sampled waveform 240 that is generated by the waveform generator of FIG. 13. As illustrated, when the present invention is employed, the fundamental component of the modulating waveform generated using the stepped sampled waveform 240 is in phase with the ideal modulating waveform.

Figure 15:
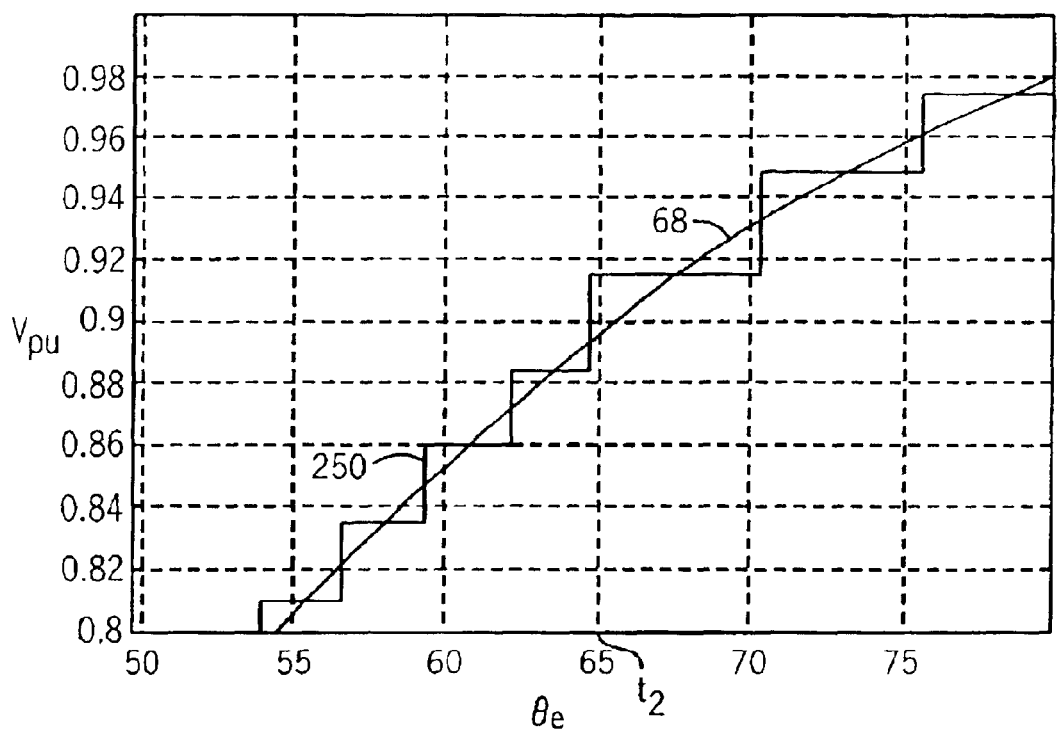
FIG. 15 is a plot similar to FIG. 7, albeit illustrating an ideal modulating waveform and a discretized waveform associated with an integer high to low carrier change with the inventive compensation system activated.
Figure 16:
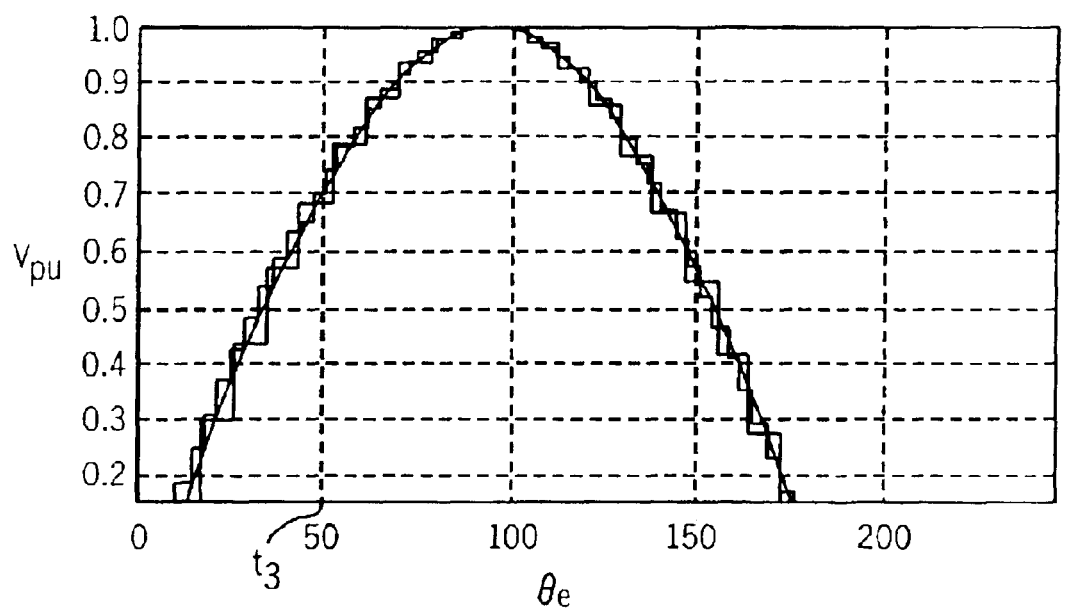
FIG. 16 is a plot similar to FIG. 15, albeit illustrating waveforms associated with a low to high non-integer carrier change with the inventive compensation system activated.

The correction concepts described above facilitate essentially distortion free high to low or low to high carrier frequency changes. In addition, the concepts can be used to facilitate non-integer ratios of carrier changes. FIG. 15 shows the case of an integer high to low carrier change. The FIG. 15 plot shows an ideal commanded modulating waveform 68 and a phase corrected sampling waveform 250 at 8 kHz which is shifted to 4 kHz at time $\tau_2$. FIG. 16 shows a low to high non-integer carrier change from 2.5 kHz to 6 kHz that occurs at time $\tau_s$. Both of the carrier change examples in FIGS. 15 and 16 were accomplished without disturbing the phase or magnitude of the fundamental modulating waveform generated.

It should be understood that the methods and apparatuses described above are only exemplary and do not limit the scope of the invention, and that various modifications could be made by those skilled in the art that would fall under the scope of the invention. For example, while the invention is describe above as one wherein the sampling and carrier frequencies are identical, it should be appreciated that the periods may be different. For instance, the sampling period in some embodiments may be twice the carrier period. Experiments using a sampling period that is twice the carrier period have generated results similar to the results described above.

In addition, while Equations 1 and 3 above include algorithms that have been found to be particularly useful, other algorithms based on operating and carrier frequency ratios and indeed simply on carrier frequency are contemplated. Moreover, while the system is described above as one wherein both phase and magnitude correction are employed, other embodiments are contemplated wherein only phase error correction is implemented.

To apprise the public of the scope of this invention, the following claims are made:

What is claimed is:

1. A method for use with a controller that samples a command frequency and provides modulating waveforms to a PWM inverter as a function of the sampled command frequency, the inverter also receiving a carrier signal having a carrier frequency, the method for reducing distortions in the modulating waveforms that result from sampling characteristics of the controller, the method comprising the steps of:

sampling the command frequency at a sampling frequency to generate a series of sampled signals;

integrating the sampled signals to generate a phase angle;

identifying a correction angle as a function of the sampling frequency;

adding the correction angle to the phase angle to generate a corrected phase angle; and using the corrected phase angle to generate the modulating waveforms to be provided to the PWM inverter.

2. The method of claim 1 wherein the step of identifying a correction angle includes identifying the correction angle as a function of both the sampling frequency and the command frequency.

3. The method of claim 2 wherein the step of identifying a correction angle includes identifying the correction angle as a function of the ratio of the command frequency to the sampling frequency.

4. The method of claim 3 wherein the step of identifying a correction angle δ includes solving the following equation:

$$\delta = \omega_e T_s/2$$

where $\omega_e$ is the command frequency in radians/second and $T_s$ is the sampling period.

5. The method of claim 4 wherein the sampling frequency is identical to the carrier frequency.

6. The method of claim 4 wherein the sampling frequency is twice the carrier frequency.

7. The method of claim 1 wherein the sampling frequency is identical to the carrier frequency.

8. The method of claim 1 wherein the sampling frequency is twice the carrier frequency.

9. The method of claim 1 wherein the step of using the corrected phase angle to generate the modulating waveforms includes the steps of:

receiving two synchronous voltage command signals;

mathematically combining the voltage command signals and the corrected phase angle to generate two phase corrected voltage command signals in the stationary frame of reference; and converting the two phase corrected voltage command signals to three phase command signals.

10. The method of claim 9 further including the step of identifying a voltage magnitude correction value as a function of the sampling frequency and wherein the step of mathematically combining the voltage command signals and the corrected phase angle includes combining the voltage command signals, the corrected phase angle and the voltage magnitude correction value.

11. The method of claim 10 wherein the step of combining the voltage command signals, the corrected phase angle and the voltage magnitude correction value includes the steps of:

multiplying the voltage magnitude correction value by the two synchronous voltage command signals to generate the corrected two voltage command signals;

performing a stationary to synchronous conversion on the corrected phase angle to generate a two by two stationary matrix; and multiplying the corrected two phase voltage command signals by the two by two stationary matrix to generate the two phase corrected voltage command signals in the stationary frame of reference.

12. The method of claim 10 wherein the step of identifying a voltage magnitude correction value as a function of the sampling frequency includes the step of identifying a voltage magnitude correction value as a function of both the sampling frequency and the command frequency.

13. The method of claim 12 wherein the step of identifying a voltage correction magnitude value $V_{corr}$ includes the step of solving the following equation:

$$V_{corr} = \frac{1}{\sin c(\omega_e T_s/2)}$$

where $\omega_e$ is the command frequency in radians/second and $T_s$ is the sampling period.

14. A method for use with a controller that samples a command frequency and receives two phase synchronous command voltages and provides modulating waveforms to a PWM inverter as a function of the sampled command frequency and command voltages, the inverter also receiving a carrier signal having a carrier frequency, the method for reducing distortions in the modulating waveforms that result from sampling characteristics of the controller, the method comprising the steps of:

sampling the command frequency at a sampling frequency to generate a series of sampled signals; integrating the sampled signals to generate a phase angle;

modifying the phase angle as a function of the ratio of the operating frequency to the sampling frequency to generate a corrected phase angle;

modifying the two phase command voltages as a function of the ratio of the operating frequency to the sampling frequency to generate corrected two phase voltage command signals;

mathematically combining the corrected two phase voltage command signals and the corrected phase angle to generate two phase voltage command signals in a stationary frame of reference; and converting the two phase voltage command signals in the stationary frame of reference to three phase signals to be provided to the PWM inverter.

15. The method of claim 14 wherein the step of modifying the phase angle includes solving the following equation to identify a correction angle:

$$\delta = \omega_e T_s/2$$

and adding the correction angle to the phase angle and wherein the step of modifying the two phase command voltages includes the step of solving the following equation to identify a voltage magnitude correction value Vcorr:

$$V_{corr} = \frac{1}{\sin c(\omega_e T_s/2)}$$

and multiplying the voltage magnitude correction value $V_{corr}$ by the two phase command voltages, where $\omega_e$ is the command frequency in radians/second and $T_s$ is the sampling period.

16. A controller that receives a command frequency and provides modulating waveforms to a PWM inverter as a function of the command frequency, the inverter also receiving a carrier signal having a carrier frequency, the controller for reducing distortions in the modulating waveforms that result from sampling characteristics of the controller, the controller comprising:

a sampler for sampling the command frequency at a sampling frequency to generate a series of sampled signals;

an integrator for integrating the sampled signals to generate a phase angle;

a correction angle determiner for identifying a correction angle as a function of the sampling frequency;

a summer for adding the correction angle to the phase angle to generate a corrected phase angle; and a processor using the corrected phase angle to generate the modulating waveforms to be provided to the PWM inverter.

17. The apparatus of claim 16 wherein the step of identifying a correction angle includes identifying the correction angle as a function of both the sampling frequency and the command frequency.

18. The apparatus of claim 17 wherein the correction angle determiner identifies a correction angle by identifying the correction angle as a function of the ratio of the command frequency to the sampling frequency.

19. The apparatus of claim 18 wherein the correction angle determiner identifies a correction angle δ by solving the following equation:

$$\delta = \omega_e T_s / 2$$

where $\omega_e$ is the command frequency in radians/second and $T_s$ is the sampling period.

20. The apparatus of claim 19 wherein the sampling frequency is identical to the carrier frequency.

21. The apparatus of claim 16 wherein the sampling frequency is identical to the carrier frequency.

22. The apparatus of claim 16 wherein the processor receives two phase synchronous voltage command signals and includes a combiner that mathematically combines the voltage command signals and the corrected phase angle to generate two phase corrected voltage command signals in the stationary frame of reference and a converter that converts the two phase corrected voltage command signals to three phase command signals.

23. The apparatus of claim 22 further including a voltage magnitude correction value determiner for identifying a voltage magnitude correction value as a function of the sampling frequency and wherein the combiner mathematically combines the voltage command signals, the corrected phase angle and the voltage magnitude correction value.

24. The apparatus of claim 23 wherein the combiner includes a multiplier that multiplies the voltage magnitude correction value by the two phase synchronous voltage command signals to generate corrected two phase voltage command signals, a stationary to synchronous converter that performs a stationary to synchronous conversion on the corrected phase angle to generate a two by two stationary matrix and a multiplier that multiplies the corrected two phase voltage command signals by the two by two stationary matrix to generate the two phase corrected voltage command signals in the stationary frame of reference.

25. The apparatus of claim 23 wherein the voltage magnitude correction value determiner identifies a voltage correction magnitude value Vcorr by solving the following equation:

$$V_{corr} = \frac{1}{\sin c(\omega_e T_s / 2)}$$

where $\omega_e$ is the command frequency in radians/second and $T_s$ is the sampling period.

* * * * *